United States Patent [19]

Wan et al.

[11] Patent Number: 5,490,977
[45] Date of Patent: Feb. 13, 1996

[54] REMOVAL OF CO, HYDROCARBONS AND $NO_x$ WITH CATALYST CONTAINING PLATINUM RHODIUM

[75] Inventors: Chung-Zong Wan, Somerset; Samuel J. Tauster, Englishtown; Harold N. Rabinowitz, Upper Montclair, all of N.J.

[73] Assignee: Engelhard Corporation, Iselin, N.J.

[21] Appl. No.: 104,838

[22] Filed: Aug. 10, 1993

Related U.S. Application Data

[60] Division of Ser. No. 775,666, Oct. 11, 1991, Pat. No. 5,254,519, which is a continuation-in-part of Ser. No. 483,485, Feb. 22, 1990, Pat. No. 5,057,483.

[51] Int. Cl.$^6$ ........................................ B01J 23/63
[52] U.S. Cl. ............... 423/210; 423/239.1; 423/213.5; 423/245.2; 423/247
[58] Field of Search ................ 423/210, 213.5, 423/239.1, 245.2, 247; 502/326, 327, 252

[56] References Cited

U.S. PATENT DOCUMENTS

| | | | |
|---|---|---|---|
| 4,171,288 | 10/1979 | Keith et al. | 423/213.5 |
| 4,233,189 | 11/1980 | Gandhi et al. | 423/213.5 |
| 4,675,308 | 6/1987 | Wan et al. | 423/213.5 |
| 4,806,519 | 2/1989 | Chiba et al. | 502/252 |
| 4,957,896 | 2/1988 | Matsumoto et al. | 502/304 |
| 5,057,483 | 10/1991 | Wan | 423/213.5 |
| 5,139,992 | 8/1992 | Tauster et al. | 502/304 |

FOREIGN PATENT DOCUMENTS 63-240947  10/1988  European Pat. Off. .

Primary Examiner—Gary P. Straub

[57] ABSTRACT

A catalyst composition suitable for three-way conversion of internal combustion engine, e.g., automobile gasoline engine, exhaust gases includes a catalytic material disposed in on a carrier. The catalytic material contains a co-formed (e.g., co-precipitated) rare earth oxide-zirconia support on which a first rhodium catalytic component is dispersed, and an alumina support having a platinum catalytic component dispersed thereon. The catalytic material may also include a second rhodium catalytic component dispersed on the alumina support bearing the platinum or a second alumina support. The catalytic material may be disposed as a catalytic coating directly on the carrier or upon an optional undercoat which is disposed on the carrier and which includes alumina and optionally, ceria and/or, iron oxide. One or more of a metal oxide which is effective for the suppression of hydrogen sulfide emissions (such as bulk nickel oxide), thermal stabilizers such as alkaline earth oxides, rare earth oxides and zirconia may be dispersed throughout the catalytic coat and/or the undercoat. The present invention also provides a method for treating engine exhaust gases by contacting the gases under conversion conditions with the catalyst composition.

13 Claims, No Drawings

REMOVAL OF CO, HYDROCARBONS AND NO$_x$ WITH CATALYST CONTAINING PLATINUM RHODIUM

RELATED APPLICATION

This is a divisional of application Ser. No. 07/775,666, filed Oct. 11, 1991, now U.S. Pat. No. 5,254,519, which is a continuation-in-part of 07/483,485, filed Feb. 22, 1990, now U.S. Pat. No. 5,057,483.

BACKGROUND OF THE INVENTION

1. Field of the Invention

The present invention is concerned with catalysts useful for the treatment of gases to reduce contaminants contained therein, such as catalysts of the type generally referred to as "three-way conversion" or "TWC" catalysts. TWC catalysts are polyfunctional in that they have the capability of substantially simultaneously catalyzing both the oxidation of hydrocarbons and carbon monoxide and the reduction of nitrogen oxides in a gaseous stream. Such catalysts find utility in a number of fields, including the treatment of the exhaust gases from internal combustion engines, such as automobile and other gasoline-fueled engines.

2. Background and Related Art

In order to meet governmental emissions standards for internal combustion engine exhausts, so-called catalytic converters containing a suitable catalyst such as a TWC catalyst, are emplaced in the exhaust gas line of internal combustion engines to promote the oxidation of unburned hydrocarbons ("HC") and carbon monoxide ("CO") and the reduction of nitrogen oxides ("NO$_x$") in the exhaust gas. For this purpose, TWC catalysts comprising a minor amount of one or more platinum group metals (e.g., platinum or palladium plus rhodium) distended upon a high surface area, refractory metal oxide support (e.g., activated alumina) and carried on a carrier such as a monolithic carrier comprising a refractory ceramic or metal honeycomb structure, are well known in the art.

The catalytically active materials dispersed on the activated alumina may contain, in addition to the platinum group metals, one or more base metal oxides, such as oxides of nickel, cobalt, manganese, iron, rhenium, etc., as shown, for example, in C. D. Keith et al U.S. Pat. No. 4,552,732. The activated alumina typically exhibits a BET surface area in excess of 60 square meters per gram ("m$^2$/g"), often up to about 200 m/g or more. Such activated alumina is usually a mixture of the gamma and delta phases of alumina, but may also contain substantial amounts of eta, kappa and theta alumina phases.

The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see C. D. Keith et al U.S. Pat. No. 4,171,288.

TWC catalysts are currently formulated with complex washcoat compositions containing stabilized Al$_2$O$_3$, an oxygen storage component, primarily ceria, and precious metal catalytic components. Such catalysts are designed to be effective over a specific operating range of both lean of, and rich of, stoichiometric conditions. (The term "oxygen storage component" is used to designate a material which is believed to be capable of being oxidized during oxygen-rich (lean) cycles of the gas being treated, and releasing oxygen during oxygen-poor (rich) cycles.)

Oxygen storage components as well as alumina support materials are susceptible to thermal degradation at the high operating temperatures engendered by smaller automotive engines and high speed highway driving, and such thermal degradation adversely affects the stability of the catalyst and effectiveness of the precious metals used therein. In addition, attempts to improve fuel economy by using air-to-fuel ("A/F") ratios higher than stoichiometric, and/or fuel shut-off features, generate a lean (oxygen-rich) exhaust. High exhaust gas temperatures and lean gas conditions accelerate the deterioration of platinum and rhodium catalysts, inasmuch as platinum is more readily sintered, and rhodium more strongly interacts with support materials such as alumina, at such conditions.

The art has devoted a great deal of effort in attempts to improve the efficiency of platinum and rhodium-based TWC compositions. Thus, U.S. Pat. No. 4,675,308 discloses a method of effective utilization of rhodium by placing it on alumina which is segregated from ceria-containing particles since ceria enhances the interaction between rhodium and alumina, which renders the rhodium less active.

U.S. Pat. No. 4,806,519 separates the rhodium component in a layered structure in which rhodium is supported on alumina in a second coat which is segregated from the ceria-containing material in a first coat. However, in both cases the rhodium is still primarily in contact with alumina support particles so that any thermal degradation occurring to the alumina will inevitably affect the catalytic efficiency of the rhodium.

The use of layered coatings in catalyst compositions is also shown in two Japanese patent publications. Japanese Patent Application 88-326823/46 (J63240-947A) of Nissan Motor KK (10.02.87-JP-027383) discloses a catalyst comprising a support having two different alumina coatings separately loaded thereon. One alumina coating contains ceria-alumina and ceria on which platinum, palladium or rhodium is dispersed, and is stated to be effective for CO and HC removal. The other alumina coating, which is stated to be effective for NO$_x$ removal, is made from lanthana-alumina and zirconium oxide partially stabilized with Pr and on which palladium or rhodium is dispersed. The catalyst is stated to have TWC activity.

Nissan Motor Company Ltd. Japanese patent publication JP63 77,544 (88 77,544), 7 Apr. 1988, discloses a catalyst comprising a first washcoat containing activated alumina bearing rare earth oxides, and a second washcoat disposed over the first washcoat and containing activated alumina bearing rare earth oxides, mainly ceria and zirconia. Palladium is kept away from poisonous substances near the washcoat surfaces and forms La—O—Pd in the first washcoat and Rh—O—Zr in the second washcoat.

Co-pending and commonly assigned U.S. patent application Ser. No. 07/234,226 (now U.S. Pat. No. 4,965,243) presents a method to improve thermal stability of a TWC catalyst containing platinum and rhodium by incorporating a barium compound and a zirconium compound together with ceria in bulk form. This is stated to enhance stability of the alumina washcoat upon exposure to high temperatures.

In another approach, U.S. Pat. No. 4,233,189 teaches the use of non-alumina supports such as zirconia for rhodium, so that rhodium-alumina interaction can be avoided. However, zirconia has a lower surface area than gamma alumina and itself is not a thermally stable support. Zirconia undergoes a phase transition between its monoclinic crystalline structure and its more stable tetragonal crystalline structure over a wide temperature range. Such transition causes drastic sintering of the associated precious metals. Thus, a need still exists for improved stabilization against thermal degradation of TWC catalysts containing precious metals.

The above-mentioned co-pending parent application Ser. No. 07/483,485 (issuing as U.S. Pat. No. 5,057,483) discloses a catalyst composition containing bulk ceria and platinum group metals including platinum and rhodium, in which the catalytic components are segregated in two discrete layers or coats in order to attain, among other objectives, physical separation of the rhodium and bulk ceria components by relegating them to different coats and placement of platinum group metals in both coats. In contrast, the catalyst composition of the present invention disposes all the platinum group metals in a single coat, as described below.

SUMMARY OF THE INVENTION

The present invention provides a catalyst composition in which substantially all the platinum group metal components of the novel composition are disposed in a single layer or coat of platinum group metal-containing catalytic material disposed on a carrier. Optionally, an undercoat which is substantially free of platinum group metals and which may optionally be substantially catalytically inactive relative to the platinum group metal-containing coat may be disposed between the platinum group metal-containing coat and the carrier. The platinum group metal-containing coat is sometimes below and in the claims referred to as the "catalytic coat" although it will be appreciated that in some embodiments of the present invention it may be the only coat, and in other embodiments it may overlie an undercoat which may be catalytically inactive relative to the catalytic coat or which may contain, in still other embodiments, catalytically promoting materials other than platinum group metals.

Specifically, in accordance with the present invention, there is provided a catalyst composition comprising a carrier on which is disposed a catalytic material, the catalytic material comprising a catalytic coat comprising a co-formed rare earth oxide-zirconia support with a catalytically effective amount of a rhodium catalytic component dispersed on the co-formed rare earth oxide-zirconia support. The catalytic coat further comprises an activated alumina support and a catalytically effective amount of platinum catalytic component dispersed on the alumina support. The co-formed rare earth oxide-zirconia support may be present in an amount of from about 0.05 to 2.0 grams per cubic inch ("g/in$^3$") of the catalyst composition. The rare earth oxide of the co-formed rare earth oxide-zirconia support may comprise ceria in an amount of from about 2 to 30 percent by weight of the combined weight of ceria and zirconia in the co-formed zirconia support.

According to one aspect of the present invention, the catalytic coat may further comprise a catalytically effective amount of a metal oxide effective for the suppression of $H_2S$ emissions from the catalyst. The metal oxide effective for the suppression of $H_2S$ may be present in an amount of from about 0.01 to 0.5 g/in$^3$ of catalyst composition, calculated as the metal oxide. The metal oxide effective for the suppression of $H_2S$ is selected from the group consisting of one or more of oxides of nickel, copper, manganese and germanium. For example, the metal oxide may be bulk nickel oxide.

According to another aspect of the present invention, the catalytic coat overlies a discrete undercoat, the undercoat comprising alumina, and, optionally, a rare earth metal oxide, for example, ceria. The alumina may be activated alumina and may be present in an amount of from about 0.1 to 4.0 g/in$^3$ of catalyst composition. The rare earth oxide, e.g., ceria, may be present in an amount of from 0.01 to 1.5 g/in$^3$ calculated as metal oxide. The undercoat or the top coat may also comprise crushed cordierite.

According to another aspect of the present invention, the undercoat may further include a promoter such as iron oxide or ceria in a catalytically effective amount for promoting the oxidation of CO. The promoter may be present in an amount of from about 0.01 to 0.3 g/in$^3$ of catalyst composition, calculated as $Fe_2O_3$.

Another aspect of the invention provides that the catalytic coat further may include a catalytically effective amount of a second rhodium catalytic component which may be dispersed on the alumina support. Alternatively, the catalytic coat may include a second alumina support and the second rhodium catalytic component may be dispersed on the first alumina support, on the second alumina support or on both.

According to still another aspect of the present invention, the undercoat further may include a thermal stabilizer dispersed therein in an amount sufficient to stabilize the activated undercoat alumina and the ceria against thermal degradation. The thermal stabilizer may be selected from the group consisting of rare earth oxides, alkaline earth oxides, zirconia, and mixtures thereof. For example, the thermal stabilizer may comprise one or both of baria and zirconia, and the baria and the zirconia may each be present in an amount of from about 0.01 to 0.5 g/in$^3$ of catalyst composition.

Another aspect of the invention provides that the rare earth oxide of the co-formed rare earth oxide-zirconia support may be selected from the group consisting of one or more of oxides of cerium, neodymium and yttrium. For example, the rare earth oxide of the co-formed rare earth oxide-zirconia support may be cerium oxide.

The first rhodium catalytic component may be present in the catalyst composition in an amount of from about 0.03 to 1.0 weight percent of the combined weight of rhodium plus the co-formed zirconia support, the weight of rhodium being calculated as the metal.

In another aspect of the present invention, the catalytic coat may further include a thermal stabilizer dispersed therein in an amount sufficient to stabilize the alumina support against thermal degradation. The thermal stabilizer may comprise one or more selected from rare earth oxides, alkaline earth oxides and zirconia, which may be present in an amount of about 0.01 to 0.5 g/in$^3$ of catalyst composition.

The alumina support may be present in the catalytic coat in an amount of from about 0.10 to 4.0 g/in$^3$ of the catalyst composition.

According to yet another aspect of the present invention, the platinum catalytic component may be present in an amount of from about 0.01 to 5.0 weight percent of the combined weight of platinum, measured as the metal, and the alumina support. Stated differently, the platinum catalytic component is present in the catalytic coat in an amount of from about 5 to 100 g/ft$^3$ of catalyst composition.

Another aspect of the present invention provides that the total amount of rhodium catalytic component present in the catalyst composition may be present in an amount of from about 0.1 to 15 g/ft$^3$ of catalyst composition.

The carrier on which the catalytic material is disposed may comprise a refractory body having a plurality of substantially parallel passages extending therethrough, the passages being defined by walls and the catalytic material being coated on the walls as said undercoat and said catalytic coat.

In another aspect, the present invention provides a method for treating a gas containing noxious components comprising one or more of carbon monoxide, hydrocarbons and nitrogen oxides, by converting at least some of the noxious components to innocuous substances. The method comprises contacting the gas under conversion conditions with a catalyst composition comprising a carrier on which is disposed a catalytic material as described above, for example, a catalytic material comprising a catalytic coat carried by the carrier and comprising a co-formed rare earth oxide-zirconia support, a catalytically effective amount of a rhodium catalytic component dispersed on the co-formed zirconia support, and a catalytically effective amount of a platinum catalytic component dispersed on the alumina support.

It is recognized that some authorities consider yttrium to be a rare earth metal and some do not. In this regard the following publications are incorporated by reference herein: *Grant & Hackh's Chemical Dictionary*, McGraw-Hill Book Company, 5th Ed., page 637; *The Merck Index*, Merck & Co., Inc., 8th Ed., (1968) page 1126; and the *Handbook of Chemistry and Physics*, Chemical Rubber Company, 93d Ed., page B-233. Since some of the cited authorities consider yttrium to be a rare earth metal it shall, for economy of expression, be so considered herein. Accordingly, as used herein and in the claims the terms "rare earth metals" and "rare earth metal oxides" (or "rare earth oxides") is intended to include yttrium and its oxides, as well as the other elements (and their oxides) which elements are traditionally and universally considered to be rare earth metals, e.g., cerium, lanthanum, praseodymium, etc.

According to various other aspects of the method of the present invention, the catalytic material may comprise other components as described above.

DETAILED DESCRIPTION OF THE INVENTION AND SPECIFIC EMBODIMENTS THEREOF

The catalyst composition of the present invention provides a catalytic material coated upon a carrier, with platinum and rhodium catalytic components and respective supports therefor disposed in a single catalytic coat or layer, which may be the only coat on the carrier. Optionally, an undercoat may be applied to the carrier before the catalytic coat is applied. The present invention is not limited to embodiments including an undercoat but also includes embodiments in which the catalytic coat is disposed directly on the carrier and alone provides the catalytic material in the catalyst composition. The catalytic coat thus comprises a first group of selected components of catalytic material, including the platinum group metals and their supports, and the optional undercoat may comprise a catalytically inactive (compared to the catalytic coat) refractory metal oxide such as activated alumina or, in certain embodiments, the undercoat may include catalytically active materials other than platinum group metals. Thus, the undercoat may comprise one or more of a second group of selected components physically segregated from the components of the catalytic coat. The catalytic coat and undercoat are discrete coats, each having its own composition and identity, and are carried on a suitable carrier by being adhered to the carrier (or, in the case of the catalytic coat, by being adhered to the undercoat) as a thin, adherent coating.

The catalyst composition of the invention usually comprises a carrier of the type often referred to as a honeycomb or monolithic carrier, which carrier is a solid body characterized by having a plurality of fine, substantially parallel, continuous and open-ended gas flow passages extending therethrough. The catalytic material is dispersed as a coating on the carrier, specifically, on the walls of the gas flow passages thereof. Such carriers are normally made of a refractory, ceramic-like material such as cordierite, mullite, alumina, or any other suitable refractory material; they may also be made of a refractory metal such as stainless steel or other suitable corrosion-resistant, iron based alloys.

The discrete catalytic coat and optional undercoat of catalytic material, conventionally referred to as "washcoats", are coated onto a suitable carrier with, preferably, the undercoat adhered to the carrier and the catalytic coat overlying and adhering to the undercoat. With this arrangement, the gas being contacted with the catalyst, e.g., being flowed through the passageways of the catalytic material-coated carrier, will first contact the catalytic coat and pass therethrough in order to contact the undercoat.

The Catalytic Coat

The catalytic coat of catalytic material of the present invention, which may be used alone or with the optional undercoat described below, contains a rhodium catalytic component which is dispersed on zirconia support particles which are co-formed with, and stabilized by, one or more rare earth oxides, such as cerium oxide, neodymium oxide and yttrium oxide, preferably cerium oxide (ceria). The stabilized, co-formed rare earth oxide-zirconia support preferably contains from about 2 to 30% by weight of rare earth oxides, preferably ceria, the balance of the support being predominantly or entirely zirconia. Other rare earth oxides may be present in small or trace amounts. The function of the rare earth oxides dispersed throughout the zirconia matrix is to stabilize the zirconia against thermal degradation. For example, unstabilized zirconia undergoes a phase transition, with drastic loss of surface area, at about 950° C., but the co-formed rare earth oxide-zirconia support containing 12 weight percent $CeO_2$ exhibits a tetragonal crystalline structure throughout the temperature range of TWC catalyst use (up to about 1000° C.) without undergoing significant thermal degradation.

The co-formed rare earth oxide-zirconia support, sometimes herein and in the claims referred to simply as the "co-formed zirconia support" may be made by any suitable technique such as co-precipitation, co-gelling or the like. One suitable technique is illustrated in the article by Luccini, E., Meriani, S., and Sbaizero, O. (1989) "Preparation of Zirconia-Ceria Powders by Coprecipitation of a Mixed Zirconium Cerium Carbonate in Water With Urea", *Int. J. of Materials and Product Technology*, vol. 4, no. 2, pp. 167–175, the disclosure of which is hereby incorporated herein. As disclosed starting at page 169 of the article, a dilute (0.1M) distilled water solution of zirconyl chloride and cerium nitrate in proportions to promote a final product of $ZrO_2$—10 mol % $CeO_2$ is prepared with ammonium nitrate as a buffer, to control pH. The solution was boiled with constant stirring for two hours and complete precipitation was attained with the pH not exceeding 6.5 at any stage.

Any other suitable technique for preparing the co-formed rare earth oxide-zirconia may be employed, provided that the resultant product contains the rare earth oxide dispersed substantially throughout the entire zirconia matrix in the finished product, and not merely on the surface of the zirconia particles or only within a surface layer, thereby leaving a substantial core of the zirconia matrix without rare earth oxide dispersed therein. Thus, the zirconium and cerium (or other rare earth metal) salts may include chlorides, sulfates, nitrates, acetates, etc. The co-precipitates may, after washing, be spray dried or freeze dried to remove water and then calcined in air at about 500° C. to form the co-formed rare earth oxide-zirconia support.

Other oxide stabilizers suitable for being co-formed with the zirconia include oxides of yttrium (considered herein to be a rare earth metal) and oxides or magnesium and calcium, which of course are not rare earth metals. Oxides of these elements, as well as of cerium, are known as good zirconia stabilizers in the ceramics industry. However, in catalytic applications, zirconia not only has to withstand high temperature degradation due to phase transformation, but also has to possess a sufficiently high surface area to enable suitable dispersion thereon of the rhodium catalytic component. For this reason, and because the rare earth oxide is to be dispersed throughout substantially the entire matrix of the zirconia particles, the rare earth oxide stabilizer is not used in bulk, i.e., solid particulate, form for zirconia stabilization but is co-formed with the zirconia as described above. Further, rhodium tends to interact with bulk ceria in a manner which is deleterious to catalytic performance. Accordingly, the ceria is co-formed with the zirconia as described above. In addition, since the solubility of ceria in zirconia to form a homogeneous solid solution is about 10 mole percent, the amount of rare earth oxide co-formed with the zirconia is limited to not more than about 30 weight percent rare earth oxide, based on the weight of rare earth oxide plus zirconia, in order to avoid or minimize undesirable interaction between the rhodium catalytic component dispersed into the co-formed zirconia support, and the rare earth oxides, it being known that such interaction renders the rhodium less catalytically active. It should be noted that it is not necessary, in order to attain the benefits of the present invention, to have a homogeneous solid solution of rare earth oxide(s) in zirconia, but such homogeneous solid solution is included in the term "co-formed rare earth oxide-zirconia support".

The quantity of ingredients in the catalyst composition may be expressed as the weight of such ingredients per unit volume of the catalyst composition. This is particularly useful for a catalyst composition in which the carrier is a honeycomb-type body because this basis of expression accounts for the voids in the catalyst composition provided by the gas flow passages extending therethrough. For ingredients other than precious metals, a convenient basis is grams per cubic inch ("g/in$^3$") of the catalyst composition and for precious metals, grams per cubic foot ("g/ft$^3$") of the catalyst composition. The amount of co-formed zirconia support present is preferably not less than about 0.05 g/in$^3$, and may range from about 0.05 to 2.0 g/in$^3$.

A rhodium catalytic component is dispersed on the co-formed zirconia support and may be present in an amount of from about 0.03 to 1.0, preferably from about 0.1 to 0.6 weight percent rhodium, calculated as rhodium metal and based on the weight of rhodium plus the co-formed zirconia support. Stated otherwise, the rhodium catalytic component may be present in an amount of from about 0.1 to 15 g/ft$^3$ of catalyst composition. The rhodium may be dispersed on the co-formed zirconia support by an impregnation technique in which a slurry of fine particulate co-formed support is impregnated with a solution or dispersion of a soluble rhodium compound or complex. The slurry is then dried and calcined, and the thus-impregnated co-formed support particles provide the rhodium catalytic component dispersed thereon. (This technique of impregnating a slurry of fine, particulate support material may also be used for dispersing the other catalytic components, such as a platinum catalytic component, onto their respective supports, where indicated below.) The rhodium-impregnated co-formed zirconia support may be heated to thermally fix the rhodium on the support, typically by first drying the rhodium-impregnated support and then heating it in air at about 450° C. The rhodium, when dispersed on a particulate, co-formed zirconia support as described above, serves its usual function of catalyzing the oxidation of CO and the reduction of NO$_x$ in the gases being treated, even after high temperature engine aging, and without significant loss of activity.

The catalytic material includes an activated alumina support on which a platinum catalytic component is dispersed, and which is referred to herein as the alumina support. The platinum catalytic component provides capacity for catalyzing the conversion of CO to $CO_2$ and HC to $CO_2$ and $H_2O$. The platinum catalytic component may be dispersed into the alumina support particles by an impregnation technique described above and well known in the art. The platinum catalytic component may be thermally fixed on the alumina support before the platinum-impregnated alumina support is incorporated into the catalytic coat. The platinum catalytic component is present in an amount of from about 0.01 to 5.0 weight percent of the combined weight of the platinum catalytic component (as platinum metal) and the alumina support (including the weight of any thermal stabilizers, measured as metal oxide, impregnated into the support). Stated otherwise, the platinum catalytic component is present in an amount of from about 5 to 100 g/ft$^3$ of catalyst composition. The alumina support present in the catalytic coat is preferably present in an amount of from about 0.1 to 4.0 g/in$^3$.

The catalytic coat may be stabilized against thermal degradation. A number of thermal stabilizers such as alkaline earth metal oxides, zirconia, and rare earth metal oxides including ceria, are suitable to thermally stabilize activated alumina. Zirconia is preferred as a stabilizer For the activated alumina used in the catalytic coat. Thus, the alumina support is stabilized with zirconia and may be prepared by comminuting activated alumina particles to a desired size range, and then impregnating the comminuted particles with a solution of a soluble zirconium salt. After the impregnation, the impregnated alumina particles are calcined to convert the impregnated zirconium salt, e.g., zirconium nitrate, to zirconia. The amount of stabilizer used to thermally stabilize the alumina support (and any other activated alumina used in the catalytic coat, e.g., the second alumina support described below) is from about 0.01 to 0.5 g/in$^3$ of catalyst composition.

If it is desired to incorporate into the catalytic coat a quantity of rhodium in excess of that which can be dispersed on the co-formed rare earth oxide-zirconia support or, if it is desired for any reason to disperse part of the rhodium catalytic component content of the catalytic coat on a support other than the co-formed rare earth oxide-zirconia support, an additional, second rhodium catalytic component may be dispersed on an activated alumina support, which may be the first alumina support. Thus, the first alumina support may have both platinum and rhodium catalytic components dispersed therein. Alternatively, the second rhodium catalytic component may be dispersed on activated alumina particles comprising a second alumina support, which support may comprise activated alumina. In such case, the platinum catalytic component is supported on one batch of activated alumina (the first alumina support) and the second rhodium catalytic component is supported on a separate batch of activated alumina (the second alumina support). The second rhodium catalytic component may be dispersed into its activated alumina support particles (the first or second alumina support, as the case may be) by impregnating the comminuted particles with a solution of a soluble rhodium salt such as rhodium chloride, rhodium nitrate, etc. The impregnated particles are then dried and calcined to form an activated rhodium catalytic component, using techniques well known in the art.

The total rhodium catalytic component present in the catalytic coat (the sum of the rhodium present as both the first rhodium catalytic component dispersed on the co-formed zirconia support and the second rhodium catalytic component dispersed on the activated alumina) may range from about 0.1 to 15 g/ft$^3$ in the finished catalyst composition.

The catalytic coat may also include a metal oxide effective for the suppression of any $H_2S$ which may be present in the exhaust gases. The $H_2S$ suppressor may thus be in bulk form preferably comprising particles of at least 0.1 micron in diameter. Such bulk metal oxides are not significantly soluble in the washcoat slurry used during preparation of the catalyst composition and do not readily react with activated alumina particles to form undesirable composite or combined materials which reduce the thermal stability of the activated alumina.

The metal oxide effective for the suppression of $H_2S$ emissions may be any suitable metal oxide which serves the purpose. Nickel oxide, preferably bulk nickel oxide, is a preferred component for this purpose although other oxides such as germanium oxide, copper oxide and manganese oxide are also known to be suitable for the purpose. The $H_2S$ suppressor ingredient is useful because rare earth oxides and alumina tend to trap sulfur compounds on their surfaces. The sulfur compounds, which result from the combustion of sulfur contained in gasoline, are converted to hydrogen sulfide during transient fuel-rich operating conditions such as idling and acceleration, and provide a characteristic foul odor to the exhaust gases. A suitable metal oxide $H_2S$ suppressor such as nickel oxide will at least temporarily trap any hydrogen sulfide which is formed, thereby delaying the discharge of hydrogen sulfide from the catalyst. During transient fuel-lean operation the sulfides are oxidized or otherwise decomposed in the oxygen-rich environment, and the hydrogen sulfide is converted to various sulfur compounds. The quantity of the metal oxide used depends on its hydrogen sulfide-trapping capacity. Generally, the metal oxide loading in the catalyst composition is typically from about 0.01 g/in$^3$ to 0.5 g/in$^3$, measured as the metal oxide, e.g., NiO. When the metal oxide used for suppressing the release of $H_2S$ comprises nickel oxide, it is desirable not to deposit the NiO in a dispersed form (e.g., from solution) on alumina. Consequently, the nickel oxide is preferably incorporated into the catalytic coat as a bulk fine particulate material.

It is therefore seen that the contents of the catalytic coat of catalytic material may comprise rhodium (the first rhodium catalytic component) dispersed on a co-formed rare earth oxide-zirconia support and platinum dispersed on an activated alumina support (the first alumina support). Additional rhodium, i.e., a second rhodium catalytic component, may be dispersed on the same alumina particles as the platinum or may be dispersed on a separate batch of activated alumina particles (the second alumina support). The catalytic coat may have a thermal stabilizer such as zirconia dispersed therethrough, and may also contain an $H_2S$ suppressing metal oxide.

The Optional Undercoat

The optional undercoat contains an activated alumina support material and is sometimes referred to herein as the undercoat alumina. The undercoat alumina may be stabilized against thermal degradation by incorporating one or more of suitable stabilizers known in the art. Without wishing to be bound by any particular theory, it is believed that the optional undercoat provides better contact of the exhaust gases being treated with the upper (outer) catalytic coat, and thereby improves catalyst performance.

The undercoat may further include rare earth oxides, including ceria, as a CO oxidation promoter. The amount of ceria in the undercoat may be from about 0.01 to 1.5 g/in$^3$ of the finished catalyst composition.

Like the catalytic coat, the optional undercoat may contain $H_2S$-suppressing metal oxides as described above, and these $H_2S$-suppressing metal oxides are not limited to a bulk or particulate form but may be dispersed into the coat by impregnation with liquid solutions or dispersions of salts of the metals of the $H_2S$-suppressing metal oxides followed by drying and calcination of the impregnated bulk materials (alumina, ceria, etc.). When both the catalytic coat and the undercoat contain $H_2S$-suppressing oxides, the total content of such oxides in the catalyst is from about 0.01 to 1.0 g/in$^3$.

The undercoat may also contain iron oxide, which, if present, is preferably employed in an amount of about 0.01 g/in$^3$ to 0.3 g/in$^3$ of the catalyst composition, calculated as $Fe_2O_3$. The iron oxide serves as a promoter for the oxidation of CO to carbon dioxide. Any form of ferrous or ferric oxide is suitable for use as the CO oxidation promoter.

In addition, any thermal stabilizer known in the art may be used in the undercoat, e.g., one or more of alkaline earth oxides, rare earth oxides and zirconia may be incorporated into the other ingredients in dispersed form by impregnation of the bulk ingredients (alumina, ceria, etc.) with solutions or other dispersions of soluble compounds or complexes of corresponding salts of the metals of the stabilizing oxides, followed by drying and calcination of the impregnated bulk materials. This may be accomplished by using an impregnation technique similar to that described above with respect to impregnating the platinum catalytic component onto the activated alumina support material. For example, soluble salts of zirconium and/or barium may be dissolved in an aqueous solution and the solution used to impregnate the washcoat components of the undercoat. The soluble salts, such as nitrates, are decomposed to oxides during the calcining of the catalyst composition and the resultant zirconium and/or barium oxides, by being incorporated into the activated alumina and the other metal oxides present, serve to stabilize these materials against thermal degradation. The alumina, ceria, etc., are thus stabilized against thermal degradation. The amount of such thermal stabilizers in the catalyst composition, if present, is preferably from about 0.01 g/in$^3$ to 0.5 g/in$^3$, calculated as the metal oxide, for each thermal stabilizer utilized.

The contents of the undercoat of catalytically promoting material may therefore comprise thermally stabilized activated undercoat alumina, cerium oxide which may be impregnated into the alumina and a metal oxide, which is effective for suppressing the emission of hydrogen sulfide, such as nickel oxide. The alumina, bulk ceria, and nickel oxide may also be impregnated with a stabilizing metal oxide which is preferably dispersed throughout the undercoat by impregnating all the solids thereof by the above-described technique of impregnation with solutions of the corresponding soluble stabilizer compounds, followed by calcination.

In addition to the foregoing, the optional undercoat may further comprise comminuted cordierite, to further enhance the porosity of the catalyst composition.

Preparation of the Catalyst

Generally, the catalyst composition of the present invention is prepared by coating a suitable carrier, such as a cordierite honeycomb carrier, with a washcoat containing the catalytic coat ingredients described above by dipping the carrier into an aqueous slurry of the above-described ingredients of the catalytic coat, that is, into an aqueous slurry essentially including co-formed rare earth oxide-zirconia support particles onto which a rhodium catalytic component has been dispersed, and activated alumina support particles on which a platinum catalytic component and, optionally, the other described ingredients, has been dispersed. Excess slurry is blown by compressed air from the passages of the carrier, and the thus coated carrier is dried and calcined, to provide the finished catalyst composition.

Optionally, before the catalytic coat is applied to the carrier, an undercoat essentially comprising activated alumina particles, and optionally cerium oxide and, optionally, the other described ingredients can be applied to the carrier. The undercoat catalyst may also be prepared by the known technique of preparing the ingredients in an aqueous slurry into which the carrier is dipped. The coated carrier is then dried and calcined, and the resultant undercoat-containing carrier is then coated with the catalytic coat as described above.

Certain embodiments of the invention and the efficacy thereof are demonstrated by the following Examples.

EXAMPLE 1

Catalysts According to Embodiments of the Present Invention

A quantity of 800 grams of alumina powder containing 1.14 percent by weight of platinum was prepared by impregnating the alumina powder with an adequate amount of aqueous amine-solubilized platinum hydroxide ($H_2Pt(OH)_6$) solution and calcining the impregnated alumina. Subsequent to calcining, the alumina was ball milled with water and nitric acid to form a slurry. A quantity of 288 grams of co-formed cerium oxide-zirconia powder (12 weight percent $CeO_2$, having a surface area of 55 square meters per gram ("$m^2/g$")) was impregnated with dilute rhodium nitrate solution. The wet powder was dried and then calcined at 450° C. to obtain a powder containing 0.316 weight percent rhodium, measured as rhodium metal. This powder was then mixed with the platinum-containing slurry to form a platinum- and rhodium-containing slurry. A zirconium acetate aqueous solution containing 29.4 grams $ZrO_2$ was then added to 1000 grams (solid mass) of the platinum-rhodium slurry. The final coating slurry contained roughly 47 percent by weight solids. A cordierite monolith support containing 400 flow passages per square inch of cross section was dipped in the platinum- and rhodium-containing slurry. After drying the dipped monolith and then calcining it at 450° C., the monolith picked up 1.75 $g/in^3$ of washcoat containing 2.455 $g/ft^3$ Rh on 0.45 $g/in^3$ the co-formed zirconia, 24.55 $g/ft^3$ Pt on 1.25 $g/in^3$ alumina, and 0.05 $g/in^3$ $ZrO_2$. This example is designated Experimental Example A.

Two further experimental examples were prepared according to the method described for Experimental Example A, one being designated Experimental Example B and having 1.75 $g/in^3$ of total washcoat and containing 2.455 $g/ft^3$ of rhodium dispersed on 0.30 $g/in^3$ of the co-formed zirconia support and 24.55 $g/ft^3$ of platinum dispersed on 1.40 $g/in^3$ alumina, and 0.05 $g/in^3$ $ZrO_2$. Experimental Example C contained 1.75 $g/in^3$ of total washcoat containing 2.455 $g/ft^3$ of rhodium dispersed on 0.15 $g/in^3$ of the co-formed zirconia support, 24.55 $g/ft^3$ of platinum dispersed on 1.55 $g/in^3$ alumina and 0.05 $g/in^3$ $ZrO_2$. The final coated monoliths of all the Experimental Examples contained 27 g/ft of precious metals at 10 Pt:1 Rh weight ratio.

(COMPARATIVE) EXAMPLE 2

Comparative Catalyst, Not in Accordance with the Present Invention

A two layered catalyst was prepared for comparison in accordance with the procedure for producing Example 1 set forth in parent application Ser. No. 07/483,485, issuing as U.S. Pat. No. 5,057,483. Specifically, to prepare the first catalytic coating for this (Comparative) Example 2, a quantity of 829 grams of gamma alumina powder having a surface area of 150 $m^2/g$ was impregnated with the amine-solubilized aqueous platinum solution previously described. The platinum-containing alumina, 995 grams of bulk ceria (99 weight percent $CeO_2$, having a surface area of 110 $m^2/g$), zirconium acetate solution containing 165.8 grams of $ZrO_2$, and 227.4 grams of barium hydroxide hydrate crystals were ball milled with water and acetic acid to form a slurry. A quantity of 2000 grams of the slurry (solids basis) was further mixed with 105.4 grams pulverized low surface area NiO powder, and 105.4 grams $Fe_3O_4$ powder to form a washcoat coating slurry. A monolith support of cordierite containing about 400 flow passages per square inch of cross section was dipped into the washcoat slurry. The resultant catalyzed monolith after calcination at 450° C. contained 16.37 $g/ft^3$ Pt, 0.75 $g/in^3$ alumina, 0.9 $g/in^3$ $CeO_2$, 0.1 $g/in^3$ BaO, 0.15 $g/in^3$ $ZrO_2$, and 0.1 $g/in^3$ $Fe_2O_3$.

A second washcoat was prepared and coated over the first coat. The second coat was prepared in a manner similar to that described for Experimental Example A of Example 1. After dipping the undercoated monolith into the washcoat slurry containing the second catalytic coating material, and calcining it at 400° C., the monolith picked up an additional 0.9 $g/in^3$ of washcoat containing 2.455 $g/ft^3$ Rh, dispersed on 0.3 $g/in^3$ co-formed zirconium support, 8.18 $g/ft^3$ Pt dispersed on 0.55 $g/in^3$ alumina and 0.05 $g/in^3$ $ZrO_2$. The final coated monolith contained 27 $g/ft^3$ of precious metals at 10 Pt/1 Rh weight ratio.

EXAMPLE 3

Cores of 1.5 inches in diameter and 3 inches in length were cut and separated from each of the monoliths of Experimental Example Catalysts A, B and C of Example 1, as well as the (Comparative) Example 2. The cores were loaded in a laboratory reactor and aged on an engine for 75 hours. The aging cycle employed was similar to the cycle described in Example 4 in Application Serial Number 07/483,485 (issuing as U.S. Pat. No. 5,057,483), except that step 3 in the aging cycle lasted only for 5 seconds instead of 10 seconds. After the aging, the catalysts were evaluated in a reactor mounted on an engine dynamometer at an inlet temperature of 482° C. and 80,000 VHSV, with an air-to-fuel ratio (A/F) fluctuating +/− 0.5 A/F units from stoichiometric at 1 Hz perturbations. The A/F ratio is the weight ratio of air-to-fuel (gasoline) maintained in the feed to the engine generating the exhaust gas. Thus, an A/F ratio of 14.651 is the stoichiometric ratio of air-to-fuel for the combustion of a hydrocarbon fuel having an average formula $CH_{1.88}$. The term "A/F units" is used to describe deviations from stoichiometric. Accordingly, an A/F ratio of 14.151 (a rich A/F) is expressed as −0.5 A/F unit (14.651−0.5) and an A/F of 15.151 (a lean A/F) is expressed as +0.5 A/F unit (14.651+0.5). The results of catalytic efficiencies are summarized in TABLE I.

TABLE I

|  | Relative Conversion % | | |
| --- | --- | --- | --- |
|  | HC | CO | NOx |
| Comp. Example 2* |  | baseline |  |
| Experimental A | 0 | 0 | +1 |
| Experimental B | −1 | −6 | −1 |
| Experimental C | −1 | −10 | −2 |

*The performance of (Comparative) Example 2 is used as a baseline; values for the Experimental Examples indicate performance difference with respect to the baseline as being either more or fewer percentage points than the baseline. The "Conversion %" is the percentage of the content of the indicated pollutant in the untreated gas which is converted to innocuous substances. Thus, a portion of the original content of "HC" (hydrocarbons) and "CO" (carbon monoxide) is converted to $H_2O$ and $CO_2$, and a portion of the "NOx" (nitrogen oxides) is converted to $N_2$ and $H_2O$.

The data in TABLE I compares the baseline performance of (Comparative) Example 2 to the Experimental Examples and clearly indicate that conversion efficiencies provided by Experimental Example A are comparable to those of (Comparative) Example 2 with respect to the conversion of hydrocarbons, carbon monoxide and nitrogen oxides. Experimental Examples B and C, which contained lesser amounts of the co-formed ceria-zirconia support than Experimental Example A on a $g/in^3$ basis, provide comparable performance at least with respect to the conversion of hydrocarbons and nitrogen oxides. A single coat catalyst employing proper amounts of co-formed ceria-zirconia material approaches the catalytic performance of a layered platinum- and rhodium-containing catalyst with respect to all three pollutants. Thus, segregation of platinum and rhodium layers on a carrier to achieve improved performance becomes unnecessary.

EXAMPLE 4

Catalyst According to an Embodiment of the Present Invention

A single coat catalyst according to the present invention was prepared by impregnating 1,000 grams of alumina with the platinum solution used in Example 1 to provide in the sample an amount equivalent to 19.3 grams of Pt. This was followed by ball milling in the presence of acetic acid. Separately, 500 grams of co-formed ceria-zirconia was impregnated with $Rh(NO_3)_3$ solution to provide 0.40 grams of Rh in the material. Separately, 500 grams of alumina was impregnated with a solution of $Rh(NO_3)_3$ to provide 3.5 grams of Rh in the material. This was followed by ball milling in the presence of acetic acid. The Rh/ceria-zirconia powder was added to the Rh/alumina slurry after which a solution of zirconyl acetate, equivalent 82 grams of $ZrO_2$, was added. This was combined with the Pt/alumina slurry and coated onto a cordierite monolith. After drying and calcining the dipped monolith, it contained 40 $g/ft^3$ of precious metal (Pt plus Rh) with a Pt/Rh ratio of 5:1 and 2.08 $g/in^3$ total washcoat containing 1.5 $g/in^3$ alumina, 0.5 $g/in^3$ co-formed zirconia and 0.08 g/in $ZrO_2$. This Example is designated Experimental Example D.

(COMPARATIVE) EXAMPLE 5

Comparative Catalyst, Not in Accordance with the Present Invention (Comparative) Example 5 was prepared as a double-layered catalyst having a bottom coat comprising alumina impregnated with platinum, and further comprising bulk ceria. The top coat contains alumina impregnated with rhodium, co-formed ceria-zirconia, and zirconia.

The preparation procedure is described in more detail in Japanese patent application 145,491 (1989).

This (Comparative) Example 5 contained 33.33 $g/ft^3$ Pt dispersed on 1.31 $g/in^3$ alumina, 0.74 $g/in^3$ ceria in the first coat and 6.67 $g/ft^3$ Rh dispersed on 0.36 $g/in^3$ alumina, plus 0.49 $g/in^3$ co-formed zirconia and 0.08 $g/in^3$ zirconia in the second coat (top coat). Thus, (Comparative) Example 5, contains a total of 40 $g/ft^3$ of precious metal (Pt plus Rh) with a Pt/Rh weight ratio of 5:1.

EXAMPLE 6

(Comparative) Example 5 and Experimental Example D of Example 4, 103.9 $in^3$ in volume each, were loaded in separate converters and aged for 100 hours by placing them parallel in an exhaust line of an engine using a simulated fuel shut-off aging cycle with a converter inlet temperature of 900° C. The aging cycle consists of two phases totalling 60 seconds. The first phase lasts 54 seconds and engine operates at stoichiometric set point in steady state and the second phase for 6 seconds and engine operates similar to phase one except secondary air is injected to generate 9% $O_2$ in the exhaust. Experimental Example D and (Comparative) Example 5 were then tested by placing them in the exhaust gas line of a standard V8 engine using standard unleaded fuel at 80,000 VHSV, +/− 0.3 A/F at 2 Hz, at an inlet temperature of 450° C.

The activity of the catalysts in converting unburned hydrocarbons, carbon monoxide and nitrogen oxides into less noxious forms were evaluated over a range of air-to-fuel ratios. The following TABLES II, III and IV set forth the results of this evaluation.

TABLE II

| % Conversion of Unburned Hydrocarbons | | | | | | |
| --- | --- | --- | --- | --- | --- | --- |
| | A/F Ratio | | | | | |
| | −.3 | −.2 | −.1 | S | +.1 | +.2 | +.3 |
| Comp. Example 5 | 43 | 62 | 75 | 80 | 81 | 82 | 83 |
| Exp. Example D | 49 | 67 | 78 | 82 | 83 | 82 | 82 |

TABLE III

% Conversion of Carbon Monoxide

| | A/F Ratio | | | | | | |
|---|---|---|---|---|---|---|---|
| | −.3 | −.2 | −.1 | S | +.1 | +.2 | +.3 |
| Comp. Example 5 | 46 | 43 | 70 | 85 | 96 | 95 | 96 |
| Exp. Example D | 42 | 50 | 70 | 92 | 95 | 94 | 95 |

TABLE IV

% Conversion of NOx

| | A/F Ratio | | | | | | |
|---|---|---|---|---|---|---|---|
| | −.3 | −.2 | −.1 | S | +.1 | +.2 | +.3 |
| Comp. Example 5 | 76 | 85 | 84 | 67 | 43 | 25 | 12 |
| Exp. Example D | 88 | 92 | 90 | 67 | 43 | 22 | 10 |

The data in TABLE II, TABLE III and TABLE IV show that Experimental Example D generally exceeds or at least matches the performance of (Comparative) Example 5, at stoichiometric air-to-fuel ratios and in most conditions of "rich" operating air-to-fuel ratios.

While the invention has been described in detail with respect to specific preferred embodiments thereof, it will be apparent that upon a reading and understanding of the foregoing, variations thereof may occur to those skilled in the art which lie within the scope of the appended claims.

What is claimed is:

1. A method for treating a gas comprising carbon monoxide, hydrocarbons and nitrogen oxides, comprising the step of:
    catalytically oxidizing carbon monoxide and hydrocarbons present in the gas, and catalytically reducing nitrogen oxides present in the gas, in the presence of a catalyst composition comprising;
        a refractory body having a plurality of substantially parallel passages extending therethrough, the passages being defined by walls, and
        a catalytic material disposed on the walls, the catalytic material comprising a catalytic coat, and the catalytic coat comprising,
            from 0.45 to 2.0 g/in$^3$ the catalyst composition of a co-formed rare earth oxide-zirconia support material wherein there is 2 to 30 weight percent rare earth oxide based on the weight of rare earth oxide plus zirconia, and having a first rhodium catalytic component dispersed thereon to catalyze the oxidation of carbon monoxide and catalyze the reduction of nitrogen oxides, and
            an alumina support material having a platinum catalytic component dispersed thereon to catalyze the oxidation of carbon monoxide and hydrocarbons, wherein the total rhodium catalytic component is present at from about 0.1 g/ft$^3$ to 15 g/ft$^3$ of catalyst composition and the total platinum catalytic component is present at from 5 to 100 g/ft$^3$ of the catalyst composition.

2. The method of claim 1 wherein the catalytic material further comprises a discrete activated alumina undercoat carried on the carrier and overlain by the catalytic coat.

3. The method of claim 2 or claim 1 wherein the catalytic coat further includes a catalytically effective amount of a second rhodium catalytic component dispersed on the alumina support material, wherein the total rhodium catalytic component ranges from about 0.1 to 15 g/ft$^3$ in the catalyst composition.

4. The method of claim 2 or claim 1 wherein the catalytic coat further includes a second alumina support and a catalytically effective amount of a second rhodium component dispersed on the second alumina support, wherein the rhodium catalytic component ranges from about 0.1 to 15 g/ft$^3$ in the catalyst composition.

5. The method of claim 2 or claim 1 wherein the catalytic coat includes from about 0.01 to 0.5 g/in$^3$ of the catalyst composition of a thermal stabilizer, selected from the group consisting of alkaline metal oxides, zirconia and rare earth metal oxides to stabilize the activated alumina present therein against thermal degradation.

6. The method of claim 5 wherein the thermal stabilizer is ceria.

7. The method of claim 5 wherein the thermal stabilizer is zirconia.

8. The method of claim 1 wherein the gas further contains H$_2$S, and the catalytic coat further includes an effective amount of a metal oxide selected from the group consisting of nickel oxide, germanium oxide, copper oxide, and manganese oxide, oxide present in an amount sufficient to suppress H$_2$S emissions.

9. The method of claim 1 wherein the amount of rhodium catalytic component is from 0.03 to 1.0 weight percent rhodium, as rhodium metal, based on the weight of rhodium plus the co-formed zirconia support, and the amount of the platinum catalytic component is from about 0.01 to 5.0 weight percent platinum, as platinum metal, based on the weight of the platinum plus the alumina support, with the amount of alumina being from 0.1 to 4.0 g/in$^3$ of the catalyst composition.

10. The method of claim 2 wherein the gas further contains H$_2$S, and the catalytic coat further includes an effective amount of a metal oxide selected from the group consisting of nickel oxide, germanium oxide, copper oxide and manganese oxide, present in an amount sufficient to suppress H$_2$S emissions.

11. The method of claim 10 wherein the metal oxide to suppress H$_2$S emissions is nickel oxide.

12. The method of claim 10 wherein the metal oxide loading is from about 0.01 g/in$^3$ to 0.05 g/in$^3$ of catalyst composition.

13. The method of claim 2 wherein the catalytic coat further includes iron oxide in an effective amount for promoting the oxidation of CO.

* * * * *